(12) United States Patent
Sanada et al.

(10) Patent No.: US 6,776,223 B2
(45) Date of Patent: Aug. 17, 2004

(54) HEAT EXCHANGER HAVING BRACKET MOUNTED ON SIDE PLATE OF CORE UNIT

(75) Inventors: Ryouichi Sanada, Obu (JP); Naoki Sugimoto, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/253,783

(22) Filed: Sep. 24, 2002

(65) Prior Publication Data

US 2003/0075305 A1 Apr. 24, 2003

(30) Foreign Application Priority Data

Oct. 24, 2001 (JP) ........................................ 2001-326617

(51) Int. Cl.[7] .............................................. F28F 9/007
(52) U.S. Cl. ............................ 165/67; 165/69; 165/149
(58) Field of Search ............................. 165/67, 69, 149

(56) References Cited

U.S. PATENT DOCUMENTS 6,000,460 A * 12/1999 Yamanaka et al. ............ 165/67
6,408,933 B2 * 6/2002 Fukuoka et al. ............... 165/67

FOREIGN PATENT DOCUMENTS

| JP | 4-288488 A | * 10/1992 | ............ F28F/9/00 |
| JP | 11-347666 | 12/1999 | |

* cited by examiner

Primary Examiner—Allen J. Flanigan
(74) Attorney, Agent, or Firm—Harness, Dickey & Pierce, PLC

(57) ABSTRACT

A heat exchanger such as a condenser for use in an automotive air-conditioner includes a core unit having a plurality of laminated tubes and fins. Brackets for mounting the heat exchanger on a vehicle are connected to U-shaped side plate disposed on an outside of the core unit. After components constituting the core unit including the side plate are all connected to one another by brazing, the brackets are connected to the side plate via mounting members made of rubber by staking sidewalls of the U-shaped side plate. Since the brackets are connected to the heat exchanger by staking after the heat exchanger is completed, the heat exchanger is easily brazed and the number and positions of the brackets on the side plate can be arbitrarily selected.

6 Claims, 1 Drawing Sheet

HEAT EXCHANGER HAVING BRACKET MOUNTED ON SIDE PLATE OF CORE UNIT

CROSS-REFERENCE TO RELATED APPLICATION

This application is based upon and claims benefit of priority of Japanese Patent Application No. 2001-326617 filed on Oct. 24, 2001, the content of which is incorporated herein by reference.

BACKGROUND OF THE INVENTION

1. Field of the Invention

The present invention relates to a heat exchanger such as a condenser for use in a refrigeration cycle of an automotive air-conditioner and to a manufacturing method thereof.

2. Description of Related Art

An example of an automobile heat exchanger that includes a structure for mounting the heat exchanger on an automobile, is disclosed in JP-A-11-347666. In this heat exchanger, a bracket for mounting the heat exchanger on the automobile is staked to a U-shaped side plate, and the U-shaped side plate having the bracket is assembled to a core unit, and then the assembled core unit is brazed in a furnace to form a unitary body of the core unit. In this manner, the bracket is preliminarily coupled to the U-shaped side plate, and then the bracket is firmly connected to the side plate by brazing.

There has been a problem, however, in such a conventional heat exchanger. When assembling the side plate, with which the bracket is already coupled, to the core unit, it is required to provide a complex jig for keeping the side plate together with the core unit. Further, positions of the bracket sticking out of the side plate are restricted by the shape of the jig. In addition, since the bracket extends to an outside of the assembled core unit, the bracket may interfere with a conveyor structure or other obstacles when the core unit is carried to the brazing furnace or to other places.

SUMMARY OF THE INVENTION

The present invention has been made in view of the above-mentioned problem, and an object of the present invention is to provide an improved heat exchanger to which the bracket is easily connected at any position of the side plate. Another object of the present invention is to provide a method of manufacturing such an improved heat exchanger.

A heat exchanger such as a condenser for use in an automotive air-conditioner is composed of plural elongate tubes, plural fins laminated between the tubes, a pair of header tanks connected to both longitudinal ends of the tubes. An upper side plate is connected to a top surface of a laminated unit composed of the tubes and fins, and a bottom side plate is connected to a bottom surface of the laminated unit. Both side plates are formed in a U-shape in its cross-section, opening to outside of the heat exchanger. The side plates serve to increase mechanical strength of the heat exchanger, and the heat exchanger is mounted on a mounting structure of an automotive vehicle via brackets connected to the side plate.

The bracket formed in an L-shape is connected to the side plate via a mounting member made of rubber. The mounting member includes a rectangular portion embraced by sidewalls of the U-shaped side plate and a cylindrical portion coupled to the bracket. The rectangular portion of the mounting member is positioned between the sidewalls of the U-shaped side plate and is connected to the side plate by staking end portions of the sidewalls. The mounting member is coupled to the bracket by forcibly and resiliently inserting the mounting member into a hole formed on a horizontal plate of the L-shaped bracket.

The components of the heat exchanger except the bracket and the mounting member are all assembled to form a unitary body held by holding jigs. Then, the assembled unit is put in a brazing furnace where the components constituting the unit are all solidly connected to one another by brazing. Then, the mounting member coupled to the bracket is connected to the side plate by staking the sidewalls of the side plate.

Grooves may be formed between the cylindrical portion and the rectangular portion of the mounting member, so that the mounting member is more easily and firmly connected to the side plate by accommodating the staked end portions of the sidewalls in the grooves. A reinforcing member made of an aluminum plate or a material harder than rubber may be embedded in the rectangular portion of the mounting member to secure a higher connecting strength between the mounting member and the side plate.

According to the present invention, the bracket is connected to the heat exchanger via the mounting member by staking after the heat exchanger is brazed. Therefore, the holding jigs keeping the shape of assembled unit in the brazing process are simplified. Further, the number of the brackets and their positions on the side plate are arbitrarily selected without being restricted by holding jigs.

Other objects and features of the present invention will become more readily apparent from a better understanding of the preferred embodiment described below with reference to the following drawings.

DETAILED DESCRIPTION OF THE PREFERRED EMBODIMENT

Figure 1:
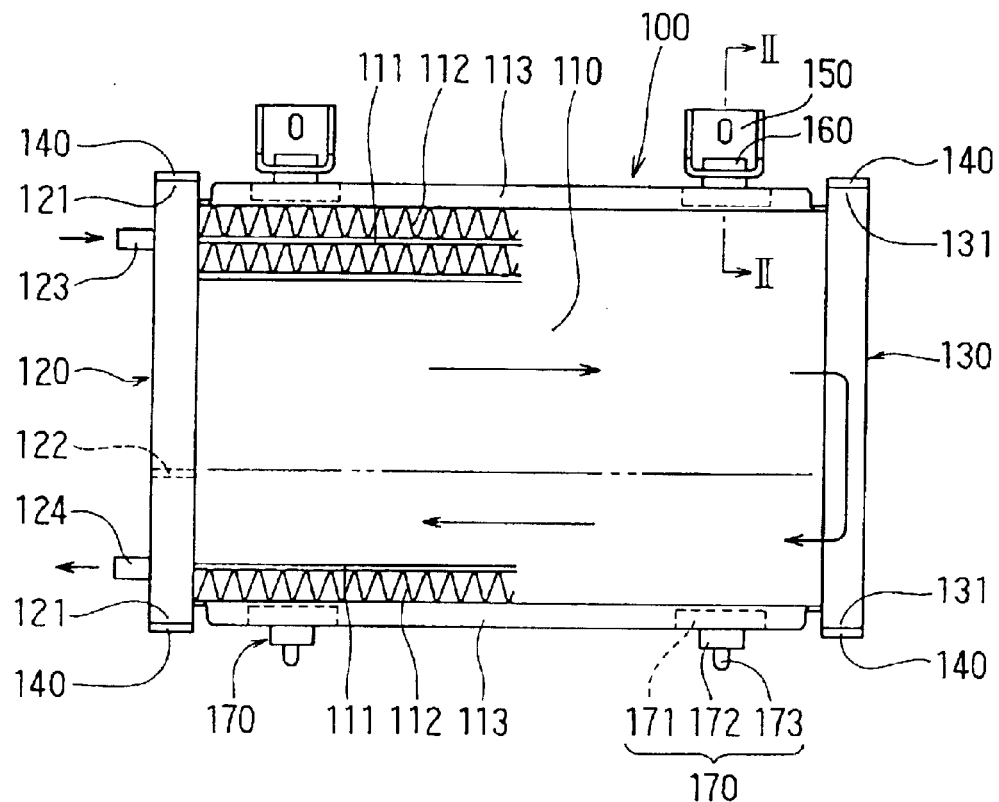
FIG. 1 is a front view showing an entire structure of a condenser according to the present invention.

A preferred embodiment of the present invention will be described with reference to FIGS. 1 and 2. The present invention is applied to a condenser 100 which functions as a heat exchanger in a refrigeration cycle for automotive air-conditioner. The condenser 100 condenses refrigerant circulating in the refrigeration cycle.

The condenser 100 is mainly composed of a core unit 110, a left header tank 120 and a right header tank 130. Brackets 150 for mounting the condenser 100 on an automotive vehicle are connected to an upper end of the core unit 110 via mounting members 160. Other mounting members 170 are also connected to a bottom end of the core unit 110. Of those components, the mounting members 160, 170 are made of rubber and other components are all made of aluminum or an aluminum alloy. The core unit 110 is composed of plural tubes 111 through which refrigerant flows, plural fins 112 is disposed between the tubes 111, and a pair of side plates 113 disposed on an uppermost fin 112 and on an lowermost fin 112, respectively. The tubes 111, the fins 112 and the side plates 113 are all laminated and connected to one another by brazing. The side plates 113 disposed on the upper and lower ends of the core unit 110 are used for increasing mechanical strength of the core unit 110. The side plate 113 is formed in a U-shape opening to the outside of the core unit 110.

The pair of header tanks 120, 130 are connected to longitudinal ends of the tubes 111, so that inner spaces of the tubes 111 communicate with inner space of the header tanks 120, 130. The pair of header tanks 120, 130 are connected to the core unit 110 by brazing. The longitudinal ends of the side plates 113 are also connected to the pair of the header tanks 120, 130 by brazing. Each tube 111 is formed in an oval shape having plural passages through which the refrigerant flows, as shown in FIG. 2. Both ends of each header tank 120, 130 are closed by cap members 140 which are connected to the header tanks 120, 130 by brazing.

Figure 2:
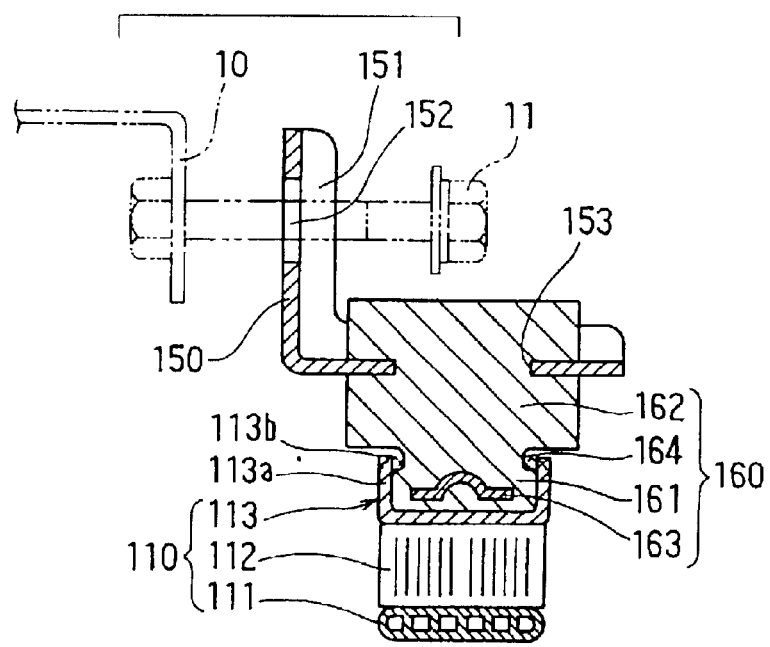
FIG. 2 is a cross-sectional view showing a bracket mounted on a side plate of the condenser, taken along line II—II shown in FIG. 1.

A separator 122 is disposed in the left header tank 120, as shown in FIG. 1. An inlet pipe 123 is connected to the left header tank 120 at a position close to the upper end of the left header tank 120, and an outlet pipe 124 at a position close to the lower end. The inlet pipe 123 is connected to an outlet port of a compressor (not shown), and the outlet pipe 124 is connected to an expansion valve (not shown). The refrigerant delivered from the compressor flows into the left header tank 120 and enters into the right header tank 130 through the tubes 111 positioned above the separator 122. The refrigerant makes a U-turn in the right header tank 130 and flows through the tubes 111 positioned below the separator 122 up to the left header tank 120, and then flows out from the left header tank 120 through the outlet pipe 124. In this course of refrigerant flow, the refrigerant makes heat-exchange with outside air and condensed.

A pair of mounting members 170 made of rubber are connected to the bottom side plate 113 thereby forming a bottom support for mounting the condenser 100 on an vehicle. The mounting member 170 includes a rectangular fixing portion 117 which is inserted into the U-shaped opening of the side plate 113 and fixed thereto, a cylindrical portion 172 for suppressing vibration, and a projection to be inserted into a mounting bracket of the vehicle. Those portions of the mounting member 170 are integrally formed in a unitary body. The mounting member 170 is connected to the bottom side plate 113 by staking sidewalls of the U-shaped bottom side plate 113.

A pair of brackets 150 are connected to the upper side plate 113 via mounting members 160 made of rubber thereby to form an upper support for mounting the condenser 100 on the vehicle. The structure of connecting the brackets 151 to the upper side plate 113 will be described in detail with reference to FIG. 2. As shown in FIG. 2, the bracket 150 made of an aluminum plate is L-shaped in its cross-section and has angled flange portions 151 for reinforcing the bracket 150. A coupling hole 153 is formed on a horizontal plate of the L-shaped bracket 150, and another hole 152 is formed on a vertical plate. For mounting the condenser 100 on the vehicle, a bolt 11 is inserted into the hole 152 and screwed to a nut connected to a mounting bracket 10 of the vehicle.

The mounting member 160 is made of rubber and has a rectangular portion 161 which is inserted into the U-shaped opening of the upper side plate 113 and fixed thereto, and a cylindrical portion 162 for suppressing vibration transferred from the vehicle to the condenser 100. The rectangular portion 161 and the cylindrical portion 162 are integrally formed as a single body. A reinforcing member 163 made of an aluminum plate or other materials harder than the material of the mounting member 160, e.g., a resin material, is embedded in the rectangular portion 161, so that compressive resiliency of the rectangular portion 161 is somewhat restricted by the reinforcing member 163. Grooves 164 are formed at a boundary portion between the rectangular portion 161 and the cylindrical portion 162.

The cylindrical portion 162 of the mounting member 160 is forcibly inserted in to the coupling hole 153 of the bracket 150 and coupled thereto. After the mounting member 160 is coupled to the bracket 150, the rectangular portion 161 of the mounting member 160 is inserted into the U-shaped opening of the side plate 113 and fixed thereto by staking upper ends 113b of sidewalls 113a. The upper ends 113b are staked to engage with the grooves 164 of the mounting member 160.

Now, a process of manufacturing the condenser 100 will be briefly described. First, tubes 111 and fins 112 are alternately laminated, and then both side plates 113 are also laminated on outermost fins 112. Thus, the core unit 110 is formed as a laminated unit. Then, the laminated core unit 110 is tightly kept by wires wound around the core unit at several positions. Components forming the left header tank 120, i.e., the separator 122, the inlet pipe 123, the outlet pipe 124 and the pair of cap members 140, are preliminarily connected to the left header tank 120 by staking or the like. The pair of cap members 140 are similarly connected to the right header tank 130. Then, both header tanks 120, 130 are preliminarily connected to the core unit 110 by inserting the tubes 111 into corresponding holes formed on the header tanks 120, 130. Thus, components forming the condenser 100 are all preliminarily connected to one another. Then, a flux material is coated on the preliminarily connected condenser 100, and the flux-coated condenser is carried into a brazing furnace. All the components of the condenser preliminarily connected are firmly fixed by brazing.

On the other hand, the bracket 150 coupled with the mounting member 160 is prepared. After the condenser 100 is brazed in the furnace, the bracket 150 is connected to the upper side plate 113 via the mounting member 160 by staking the sidewalls 113a. Two brackets 150 are connected to the upper side plate 113 in this embodiment. A pair of other mounting members 170 are similarly connected to the bottom side plate 113 by staking. The mounting member 160 may be first connected to the upper side plate 113 by staking, and then the bracket 150 may be coupled to the mounting member 160. The condenser 100 thus manufactured is mounted on the vehicle via the brackets 150 coupled to the upper side plate 113 and the mounting members 170 connected to the bottom side plate 113. Vibration transferred from the vehicle to the condenser 100 is suppressed by the resilient mounting members 160, 170.

The features of the present invention will be summarized below. The brackets 150 are connected to the upper side plate 113 via the mounting members 160 by staking the sidewalls 113a after the condenser 100 is brazed. Therefore, no brazing process is required to connect the brackets 150 to the upper side plate 113. Accordingly, jigs for holding the assembled components together for brazing are simplified. If the brackets 150 were to be connected to the upper side plate 113 by brazing, the holding jigs would be complicated because the brackets 150 stick out of the core unit 110. Further, the assembled unit can be easily carried by a conveyor to the brazing furnace since no obstacles are sticking out from the unit.

Since the mounting member 160 having resiliency is connected to the upper side plate 113 by staking, the connection between the mounting member 160 and the upper side plate 113 is firmly maintained by the resiliency of the mounting member 160 without being loosened. Since the bracket 150 is connected to the condenser 100 after the brazing process, the bracket 150 can be freely positioned at any longitudinal positions of the upper side plate 113 without being restricted by the jigs for holding the laminated core unit. Since the mounting member 160 is connected to the upper side plate 113 by staking sidewalls 113a of the U-shaped upper side plate 113, the original U-shape can be utilized for staking without making any changes or without making particular grooves for staking. Further, since the grooves 164 are formed on the mounting member 160, the staked end portions 113b of the sidewalls 113a are properly accommodated in the grooves 164 thereby to enhance reliability of staking.

Since the reinforcing member 163 is embedded in the rectangular portion 161 of the mounting member 160, an excessive resilient deformation of the rectangular portion 161 is restricted, and thereby the mounting member 160 is prevented from being separated form the side plate 113 when a large outside force is applied to the bracket 150. The reinforcing member 163, however, may be eliminated if it is not necessary in some applications.

The present invention is not limited to the embodiment described above, but it may be variously modified. For example, craws may be made on the sidewalls 113a or on a bottom plate of the U-shaped side plate 113, and the mounting member 160 may be connected to the side plate 113 by staking the craws instead of staking the end portions 113b. Though two brackets 150 are provided in the foregoing embodiment, it is, of course, possible to provide more than two brackets if such is required to meet a mounting structure of a vehicle. Also, positions of the brackets 150 on the side plate 113 may be variously changed. Though the present invention is applied to the condenser 100 in the foregoing embodiment, the present invention is applicable to other automotive heat exchangers such as radiators or intercoolers. The material of the heat exchangers is not limited to aluminum, but other materials such as copper or stainless steel may be used.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A heat exchanger for an automotive vehicle comprising:

a plurality of tubes;

a plurality of fins disposed between tubes, the tubes and the tins being alternately laminated to form a laminated core unit;

a side plate connected to an outermost portion of the laminated core unit, the side plate being formed in a U-shape which is open to an outside of the laminated core unit;

a mounting member made of rubber connected to the side plate; and a bracket for mounting the heat exchanger on the automotive vehicle, the bracket being formed in an L-shape having two legs, one leg of the L-shaped bracket defining a coupling hole coupled to the mounting member.

2. The heat exchanger as in claim 1, wherein:

the U-shaped side plate includes sidewalls; and the mounting member is connected to the side plate by staking end portions of the sidewalls.

3. The heat exchanger as in claim 2, wherein:

the mounting member includes grooves; and the staked end portions of the sidewalls are engaged with the grooves and accommodated in the grooves.

4. The heat exchanger as in claim 1, wherein:

a portion of the mounting member is embraced by the U-shape side plate; and a reinforcing member made of a material harder than that of the mounting member is embedded in the portion embraced by the U-shaped side plate.

5. The heat exchanger as in claim 1, wherein:

the mounting member is coupled to the bracket by forcibly and resiliently inserting the mounting member into a hole made on the bracket.

6. A method of manufacturing a heat exchanger for an automotive vehicle, the method comprising:

assembling a core unit composed of alternately laminated tubes and fins, a pair of side plates disposed on a top and a bottom side of the laminated tubes and fins, and a pair of header tanks connected to longitudinal ends of the tubes;

brazing the assembled core unit in a furnace to form a solidly connected unitary body of the core unit;

coupling a mounting member made of rubber to a bracket for mounting the heat exchanger on the automotive vehicle by forcibly inserting the mounting member into a coupling hole formed in the bracket; and after brazing the assembled core unit, connecting the mounting member coupled to the bracket to the side plate by staking the side plate thereby to mount connect the bracket to the side plate via the mounting member.

* * * * *